United States Patent Office 2,862,682
Patented Dec. 2, 1958

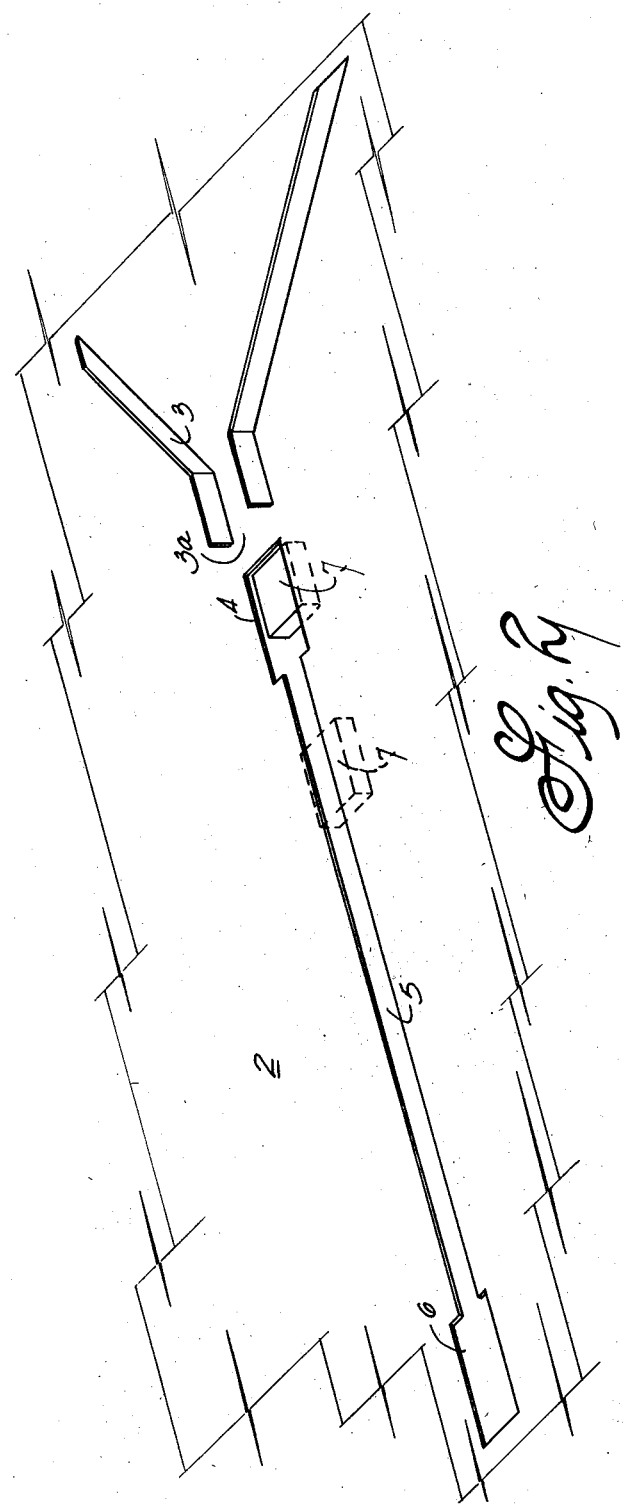

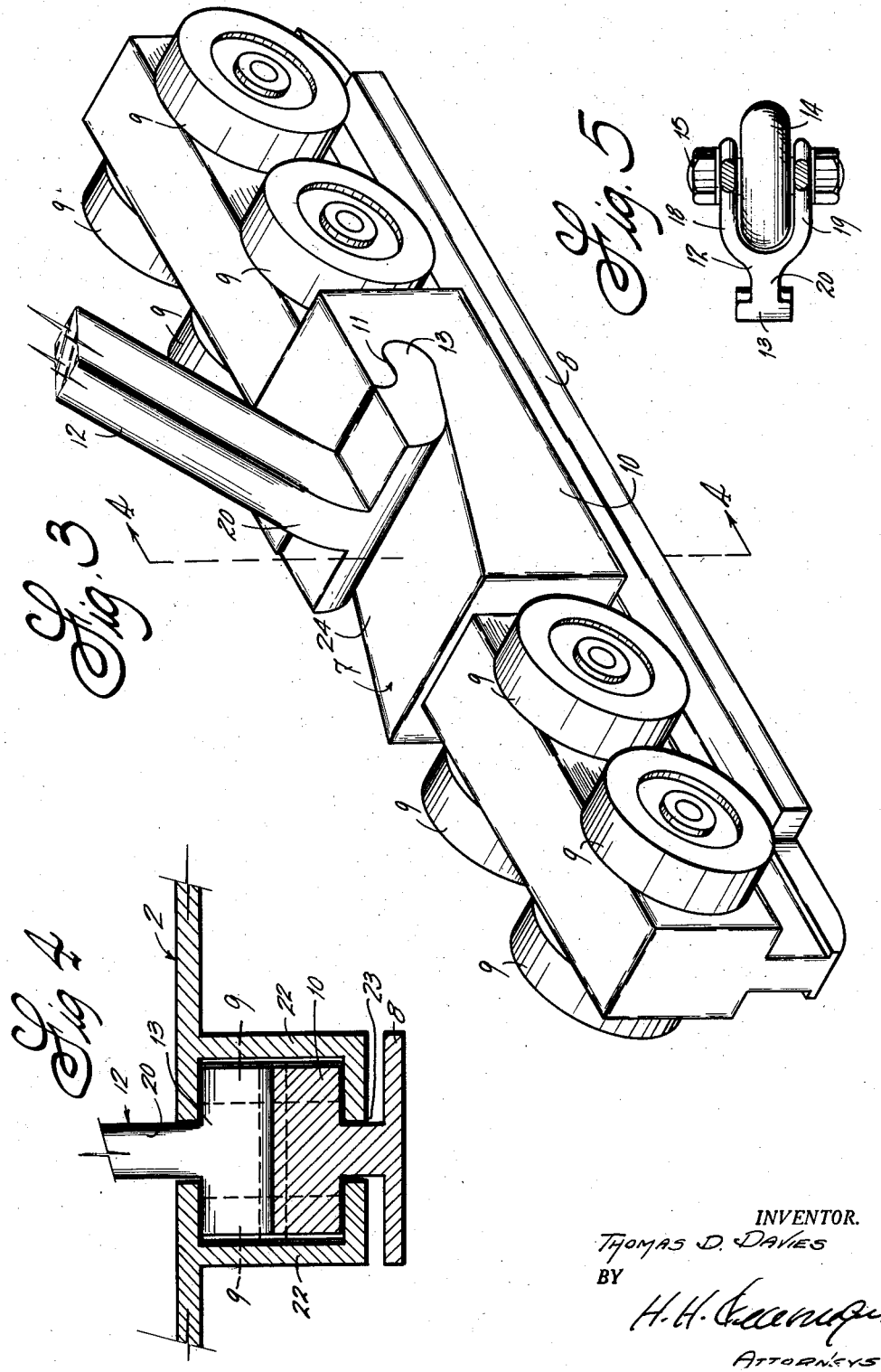

2,862,682

CATAPULT LAUNCHING ENGAGER FOR AIRCRAFT NOSEWHEEL GEAR

Thomas D. Davies, Villanova, Pa.

Application May 14, 1957, Serial No. 659,190

2 Claims. (Cl. 244—63)

(Granted under Title 35, U. S. Code (1952), sec. 266)

The invention described herein may be manufactured and used by or for the Government of the United States of America for governmental purposes without the payment of any royalties thereon or therefor.

This invention relates to a catapult launching system and an automatic shuttle hook-up arrangement preparatory to such launching.

In prior launching systems, the aircraft is lined up with the shuttle by the pilot from visual signals given to him by one of the deck crew. After lining up, the airplane is manually connected to the launching shuttle by means of a bridle connected at the two ends to the airplane and to the shuttle at its approximate midpoint. When the airplane is launched, the bridle is released automatically by the aircraft and is recovered for reuse. Using this system, errors occur in alignment of the aircraft and the shuttle; the deck crew is exposed to extreme hazards during such launching; the procedure is relatively slow; and danger of injury is ever present from the released bridle before complete recovery. The present system eliminates all these difficulties.

An object of this invention therefore is a launching system whereby the aircraft is semi-automatically aligned with the shuttle line of travel.

A further object of this invention is a system wherein the shuttle and aircraft are automatically coupled for launching.

A further object of this invention is the elimination of the launching bridle, and Still a further object is the elimination of deck or runway crews during launching operations.

These and other objects will be readily apparent to those skilled in the art from an examination of the following description and attached sheets of drawings wherein:

Figure 1 is a side view of the airplane and the shuttle launching mechanism,

Figure 2 is a perspective view of the cut-out slit in the runway and the track mechanism relative thereto, Figure 3 is an enlarged perspective view of the launching shuttle and attached tow bar, Figure 4 is a cross-sectional view along lines 4—4 of Figure 3, and Figure 5 is an enlarged plan view of the nose wheel and nose wheel hook.

Referring to Figures 1 and 2, an aircraft 1 is shown in launching position on a runway or aircraft carrier deck 2. A launching shuttle 7 is recessed beneath the deck 2 and is attached to the power launching equipment 17.

Leading to the shuttle and shuttle deck openings is a track system 3; the system is of "V shape" with the apex of the "V" leading into a deck cutout 4. The cutout extends into an extended deck guide or slot 5 with guide 5 being narrower than cutout 4. The deck guide terminates in a third slit or opening 6 which is of the same width as opening 4.

A yoked tow bar 12 is attached to the nose wheel 14 (Figure 5) by means of the yoke arms 18, 19 attached to the wheel shaft 15; the wheel 14 is, of course, attached to plane 1 by conventional wheel supporting means 16. Conventional spacers, bushing and lock nuts are provided to maintain the arms on the shaft.

Arms 18, 19 terminate in a narrow shank 20 (Figures 4 and 5) of a width slightly less than the width of opening 5. The tow bar terminates in a wide hook jaw 13 of a width slightly less than the width of openings 6, 4.

The shuttle 7 (Figures 3 and 4) rides in a track 21; the track consists of facing L-shaped members 22 depending from the deck 2 with a slot 23 separating the bottom legs of the members to provide means of attachment of the shuttle to a connecting bar 8, the latter of which is connected to the launching mechanism 17 (Figure 1).

Wheels 9 are mounted on the shuttle on either side thereof thereby reducing the friction of locomotion. The central section 10 of the shuttle 7 has a cutout 24 terminating in a groove 11 whereby the tow bar jaw 13 and the shuttle are chocked together.

In the operation of the system, retraction and extension mechanism 25 extends the rail 3 to its operating or extended position via operating linkage 26. The rail 3 projects several inches above the surface of the runway so that the taxiing aircraft has its swivel nose wheel abutted by the track and guided into the apex of the track mechanism. Upon reaching the apex, the wheel enters guides section 3a leading to deck cutout 4. At this point, the dragging tow bar 12 falls into slot 24 of shuttle's central section 10. When the shuttle 7 is brought into firing position (shown in dotted lines, Figure 2), the shuttle and tow bar are tightly chocked; at the same time, hook section 13 of the bar 12, being much wider than the width of opening 5, cannot disengage from the shuttle during the launching operation, i. e. during the time interval when the shuttle and tow bar are passing by slot 5. This, of course, insures proper engagement of the shuttle and aircraft, and guarantees release or launch of the aircraft only after the full power stroke of the launching equipment has been imparted to the shuttle.

Track 3 is retracted to the point where it is flush with or below the deck surface 2 and the shuttle and plane are moved into proper firing position; the shuttle is then catapulted by the launching equipment 17 imparting additional launching power to the plane 1 (which of course also uses its own power). The plane and shuttle remain chocked during the time of passage of the two through slot 5. When the shuttle reaches opening 6, the shuttle enters the braking range (entering brake 31) and the airplane's momentum has increased to such an extent that the tow bar separates itself from the shuttle. The opening 6, being slightly wider than the width of hook portion 13 of the tow bar, permits egress of the tow bar from the inclined opening 24 of the shuttle and the slot 6; the aircraft is launched. Braking mechanism 31 subsequently arrests the shuttle to a complete stop and the shuttle is retracted by mechanism (not shown) to its position shown in Figure 2, i. e. adjacent slot 4. Simultaneous with the retraction of the shuttle, track 3 is re-extended above the surface of the deck and another plane enters the V area for proper guidance and subsequent launching.

Obviously many modifications and variations of the present invention are possible in the light of the above teachings. It is therefore to be understood that within the scope of the appended claims the invention may be practiced otherwise than as specifically described.

What is claimed is:

1. In launching apparatus for launching aircraft having a swivelable nose wheel, a tow bar, means on one end of said tow bar for connecting said tow bar to said nose wheel for swiveling said bar with said wheel, catapult engaging means on the other end of said tow bar for connecting said tow bar to a catapult, said catapult engaging means being transversely larger than said tow bar, a deck from which said aircraft is launched, said deck having a slot extending in the direction of launching and being larger in width than said tow bar but smaller than said catapult engaging means on said tow bar, said deck having openings at the ends of said slot so that said tow bar may be engaged with said deck at one end of said slot and disengaged at its other end as is required in launching.

2. The apparatus of claim 1 including guide means on said deck at one end of said slot for directing said aircraft nose wheel into alignment with said slot and said tow bar thereby into an opening at one end of said slot.

References Cited in the file of this patent

UNITED STATES PATENTS

| | | |
|---|---|---|
| 1,611,882 | Budd | Dec. 28, 1926 |
| 1,901,017 | White | Mar. 14, 1933 |
| 2,145,685 | Chilton | Jan. 31, 1939 |
| 2,611,355 | Ashwood | Sept. 23, 1952 |
| 2,777,650 | Fosness et al. | Jan. 15, 1957 |